UNITED STATES PATENT OFFICE 2,003,061

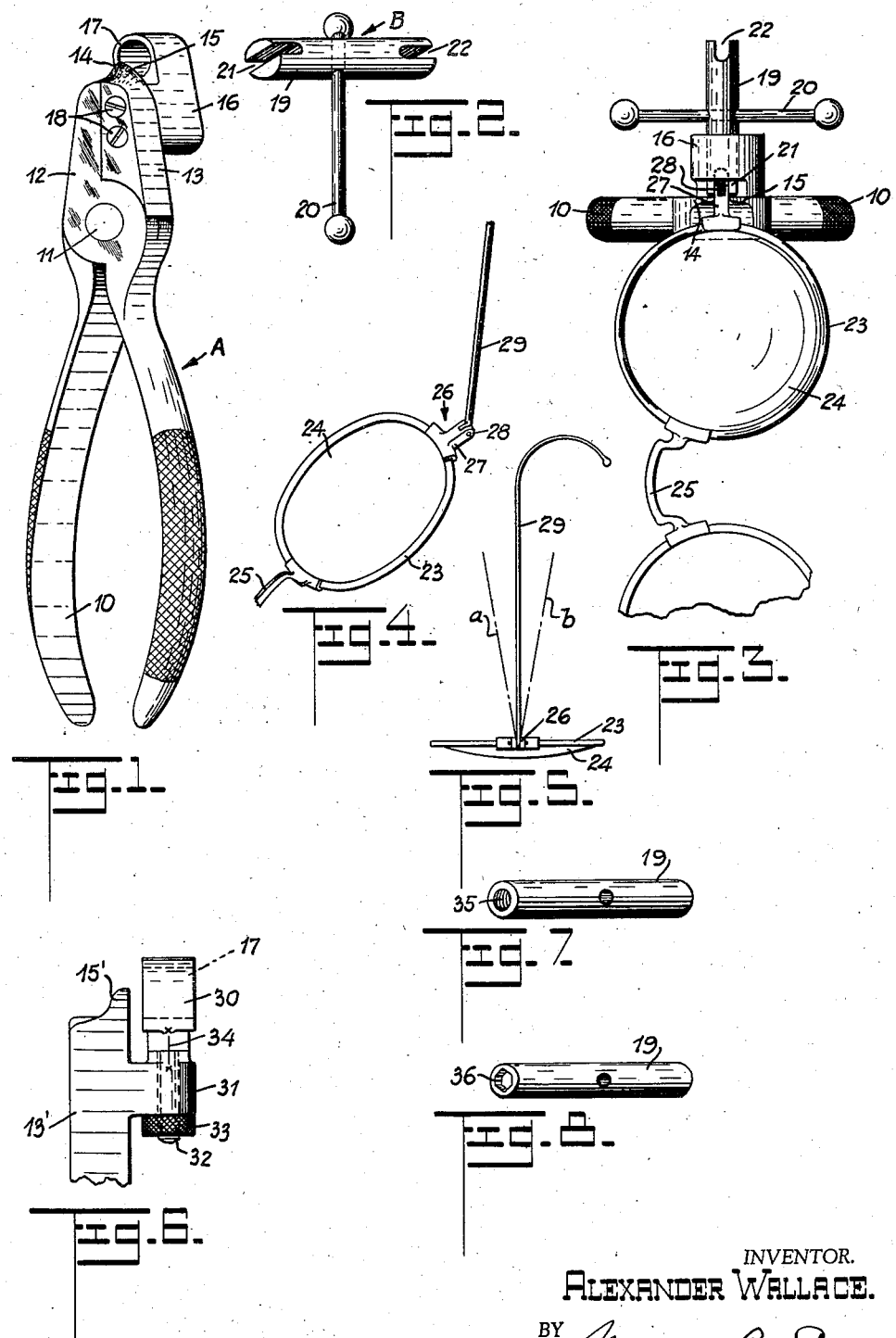

TOOL

Alexander Wallace, New Rochelle, N. Y., assignor of two-fifths to Lewis H. Saper and Moses Cohen, of New York Application April 19, 1933, Serial No. 666,822

5 Claims. (Cl. 81—3.6)

My invention relates to improvements in tools used for performing some very delicate adjustments on articles such as eyeglasses and more particularly to the kind of glasses with temples. On account of the many different head formations, where the part of the nose supporting the eyeglasses may be either relatively above or below the top of the ear, adjustment in the temples in relation to the glasses will be required. Heretofore this operation has been very difficult to perform on account of the liable breakage of the glasses, especially in the frameless type, in which the temple hinge is fastened directly to the lens instead of a frame. With this improved tool the mechanic is enabled to hold the hinge portion close to the rim and twist or angle the hinge part itself slightly in the required direction. This tool may be also used for cutting threads, tightening nuts on precision instruments and etc.

An object of this invention, is therefore, to provide a tool which will permit adjustment of the temples on eyeglasses without the danger of breakage.

Another object of this invention is to make this adjustment so easily performed that no specially skilled person will be required to do this adjustment.

Another object of this invention is to provide a tool which can be used for other purposes such as cutting fine threads, tightening small nuts, etc.

A still further object of this invention is to provide for a tool giving a firm grip such as is obtained in a large vise during the adjustment.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, a drawing depicting a preferred and a modified form has been annexed as a part of this disclosure, and in such drawing, like characters of reference denote corresponding parts throughout all the views, of which:—

Fig. 1 is a perspective view of a tool embodying and employing the invention.

Fig. 2 is a perspective view of a chuck usable in conjunction therewith.

Fig. 3 is a top view of the invention when in use.

Fig. 4 is a portion of an eyeglass.

Fig. 5 is a diagrammatic view of an eyeglass.

Fig. 6 is a modification of the jaw portion of the tool, in which the article holder is adjustably mounted.

Fig. 7 is a modified form of chuck or wrench used for cutting thread.

Fig. 8 is a modified form of chuck or wrench used as a key to tighten nuts.

An embodiment of the invention consists essentially of two parts, the special plier A and the chuck B. The plier is constructed in the conventional way with handle portions 10, fulcrum pin 11 and jaws 12 and 13. The top of the jaws 12 and 13 have raised extensions 14 and 15 to facilitate the gripping of the article to be marked upon or adjusted. Jaw 13 is provided with a tool guide or journal 16 having an opening 17. This tool guide may be an integral part of jaw 13 or may be separately attached by means of screws 18. The opening 17 is of a size so as to accommodate chuck or wrench B. The chuck or wrench B consists of the shank member 19 and a handle portion 20 in slidable engagement therewith. The shank member 19 is provided with slots 21 and 22. On account of differences in the hinge construction of the various eyeglasses, it has been found advisable to make slot 21 in the center of shank member 19, while slot 22 is slightly offset from the center.

The operation of the instrument is illustrated in Figure 3, in which the numeral 23 represents the rim of the spectacles, the numeral 24 represents the lens, and the numeral 25 the bridge. The hinge 26 of the temple portion of the eyeglasses consists of a portion 27 close to the rim and a portion 28, the hinge itself. A purpose of the invention is to grip part 27 firmly while twisting or angling part 28 in the required direction by turning handle 20, after jaw 21 has been engaged with the hinge portion 28.

To still further the usefulness of the device, it may be provided with an adjustable tool holder 30 shown in Figure 6, in which portion 31 is integral with jaw 13'. Tool holder 30 is provided with a threaded shank 32 and a nut 33 to lock the same securely in the desired position. To return the same in to the original straight line, graduation marks 34 may be provided.

It is understood that the temples 29 may need adjustment in either direction "a" or "b" shown in Figure 5.

The tool's usefulness may be enhanced by providing different interchangeable parts such as a thread cutter 35 or a nut tightener 36.

It is believed from the above description that those skilled in the art will have no difficulty in understanding the construction, the method of use and operation of the device herein disclosed and a detailed discussion thereof is unnecessary. The invention is of simple and practical construction and is adapted to accomplish among others all of the objects and advantages herein set forth.

Without further analysis, the foregoing will so fully reveal the gist of this invention that others can by applying current knowledge readily adapt it for various applications without omitting certain features, that, from the standpoint of the prior art, fairly constitute essential characteristics of the generic or specific aspects of this invention, and therefore, such adaptations should and are intended to be comprehended within the meaning and range of equivalency of the following claims:

I claim:

1. A tool for handling spectacles for angling an end piece thereof comprising a pair of jaws for clamping said end piece, a journal associated with said jaws, and a wrench adapted to be received in said journal and to engage said end piece, said wrench being adapted for rotation within the journal for angling said end piece.

2. A tool for handling spectacles while angling an end piece thereof, comprising a pair of pivoted jaws for clamping the said end piece, and a journal adjacent said jaws and adapted to receive a rotatable member whereby said end piece may be angled.

3. A tool for handling spectacles for angling an end piece thereof, comprising a pair of pivoted jaws, a journal extending from one of said jaws, a chuck adapted to be rotatably mounted in said journal, said jaws being adapted to clamp an end piece of the spectacles and said chuck being adapted for engagement with said end piece whereby the latter may be angled.

4. A tool for angling an end piece of eyeglasses comprising means to grip a portion of said end and means to engage another portion thereof, said latter means having an opening within which the latter portion may be received for angling, and means to facilitate the angling.

5. A device of the character described, comprising a vise, a journal associated with said vise, a wrench to rotatably fit in said journal for co-operative relation with the jaws of the vise, and a handle associated with said wrench to facilitate operation thereof, said wrench having end slots in axial alinement and offset with relation to each other.

ALEXANDER WALLACE.